United States Patent [19]

Nagy et al.

[11] 4,025,688
[45] May 24, 1977

[54] POLARIZER LAMINATION

[75] Inventors: Alexander W. Nagy, Dorado, P.R.; Giorgio B. Trapani, Cambridge, Mass.

[73] Assignee: Polaroid Corporation, Cambridge, Mass.

[22] Filed: Nov. 24, 1975

[21] Appl. No.: 634,635

Related U.S. Application Data

[63] Continuation-in-part of Ser. No. 493,569, Aug. 1, 1974, abandoned.

[52] U.S. Cl. .............................. 428/350; 350/152; 350/155; 350/160 LC; 428/1; 428/457; 428/461; 428/462

[51] Int. Cl.² .................. C09J 7/02; C09K 3/34; G02B 5/30

[58] Field of Search .............. 428/1, 4 H, 350, 463, 428/462, 521, 461; 350/154, 155, 160 LC, 152; 252/408; 427/163

[56] References Cited

UNITED STATES PATENTS

| | | | |
|---|---|---|---|
| 2,524,286 | 10/1950 | Dreyer | 428/1 |
| 2,776,598 | 1/1957 | Dreyer | 350/155 |
| 3,208,902 | 9/1965 | Arond et al. | 350/155 X |
| 3,313,052 | 4/1967 | Malster | 40/2.2 |
| 3,499,702 | 3/1970 | Goldmacher et al. | 350/150 |
| 3,531,351 | 9/1970 | Buzzell | 156/249 |
| 3,545,998 | 12/1970 | Buzzell | 427/163 |
| 3,712,849 | 1/1973 | Robbiati | 428/463 X |
| 3,719,544 | 3/1973 | Buzzell | 350/155 X |
| 3,832,034 | 8/1974 | Edmonds | 350/160 LC |
| 3,833,289 | 9/1974 | Schuler | 350/155 |
| 3,837,729 | 9/1974 | Harsch | 350/160 LC |
| 3,914,022 | 10/1975 | Kashnow | 350/160 LC |

Primary Examiner—P. E. Willis, Jr.
Attorney, Agent, or Firm—Esther A. H. Hopkins

[57] ABSTRACT

A novel reflective light-polarizing lamination comprising a light polarizer laminated to the matte surface of aluminum foil and useful in display cells for field-effect transition liquid crystal displays.

6 Claims, 3 Drawing Figures

POLARIZER LAMINATION

CROSS-REFERENCE TO RELATED PATENT APPLICATIONS

This application is a continuation-in-part of U.S. application Ser. No. 493,569 filed Aug. 1, 1974, now abandoned.

BACKGROUND OF THE INVENTION

A field-effect transition device consists of a thin glass cell filled with a 10–20 μm layer of nematic liquid crystals. The inner walls of the cell are coated with an electroconductive material and treated so as to impart a specific spatial orientation to the liquid crystal molecules. As a result of this molecular orientation, the cell has the property of rotating the plane of vibration of linearly polarized light by ninety degrees. During the application of an electric field between the cell walls this optical property is reversibly destroyed and linearly polarized light is transmitted by the cell without rotation. Thus, if the cell is placed between crossed polarizers, it will transmit light when the electric field is off and extinguish it when the field is on. By choice of the electrode pattern and by selective application of the electric field, any dark-light display may be obtained. Devices which may make use of this display include time-keeping devices such as wrist watches, clocks and timers; technical instruments such as laboratory equipment, and hand calculators; and alphanumeric displays such as remote computer read-outs, scoreboards, visual paging system, etc.

The field-effect transition display may be used in a transmissive mode or in a reflective mode. In the reflective mode the reflector should ideally be diffusely reflecting with a directional preference in a plane perpendicular to the plane of the device and parallel to the direction of the digits or letters sought to be displayed. In this mode especially, it is important that the polarizer be as thin as possible and be bonded to the reflector to avoid liquid losses to surface reflections. Various methods of bonding a polarizer to a reflector and cell were tried including spraying aluminum paint onto the polarizer or evaporating aluminum onto the matte surface, neither method yielding good reflectors; or bonding the polarizer with a pressure-sensitive adhesive, which alters the texture of the aluminum. None of these attempts resulted in significant yields of field-effect transition liquid crystal display cells which are free of cosmetic defects. Yields are low and there is no feasible way of reworking rejects.

OBJECTS OF THE INVENTION

One of the objectives of the present invention, therefore, is to provide a reflective light-polarizing lamination which may be used in a field-effect transition liquid crystal display device.

Another object of the invention is to provide a reflective light-polarizing lamination which may be bonded to a liquid crystal cell to provide a high yield of commercial grade cells.

Still another object of this invention is to provide a thin polarizer bonded to a diffuse reflector with an optical quality bond.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description, taken in connection with the accompanying drawings wherein.

DESCRIPTION OF THE INVENTION

Figure 1:
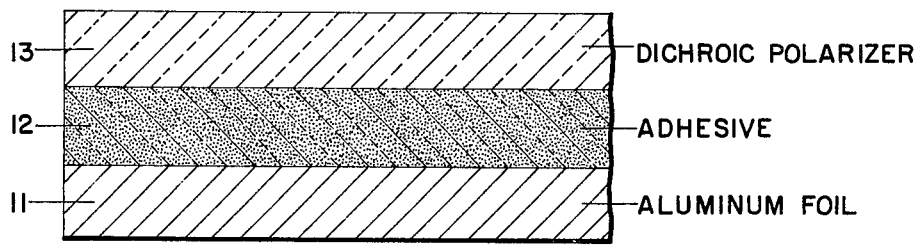
FIG. 1 is a diagram of one embodiment of the present invention showing the unsupported polarizer laminated to aluminum foil.
Figure 2:
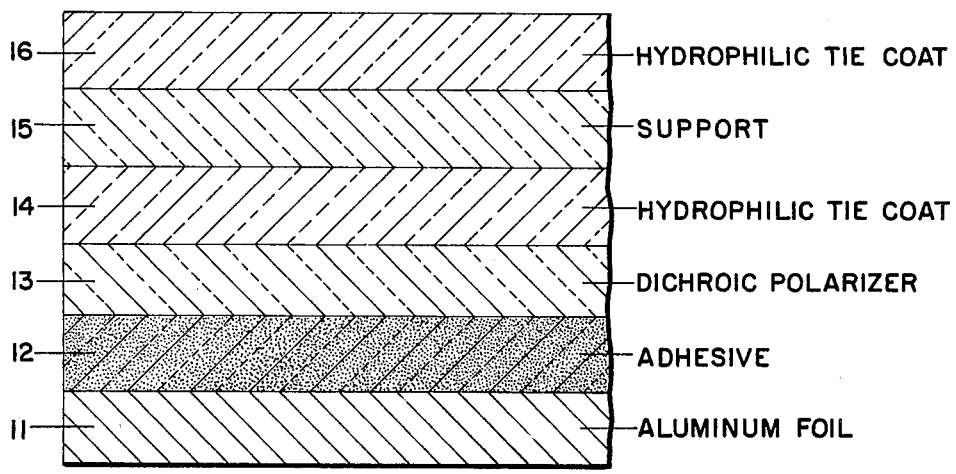
FIG. 2 is a diagram of another embodiment of the invention depicting a supported polarizer laminated to aluminum foil.
Figure 3:
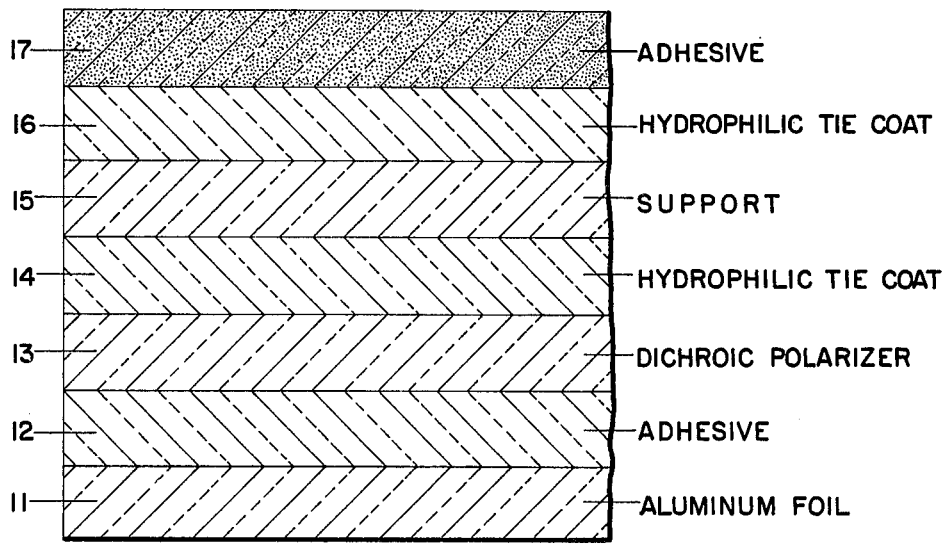
FIG. 3 is a diagram of still another embodiment of the invention depicting the supported polarizer laminated to aluminum foil with a layer of adhesive on the supported polarizer whereby the lamination may be attached to a liquid crystal cell.

It has been found that an optical quality lamination of a light polarizer and an aluminum foil can be made. This lamination will be made using a transparent thermoplastic synthetic resin, as, for example, a polymerized vinyl ester such as polyvinyl acetate or polyvinyl butyral or a polymeric emulsion of 1,3-butadiene as an adhesive. Such a lamination is shown, for example, in FIG. 1 where 11 represents the aluminum foil, 12 represents the adhesive and 13 represents the dichroic polarizer.

The aluminum foil 11 used in this invention may be up to about 0.0015 inch thick but is preferably 0.00065 inch thick; and has at least one matte finish surface, which surface is characterized by a grooved structure. In the present invention the stretch axis of the polarizer is preferably aligned with the grooves in the matte surface of the foil. This provides a lobe of high intensity reflection perpendicular to the stretch axis of the polarizer which results in a brighter display. This brightness, resulting from the alignment of the grooves in the aluminum and the stretch axis of the polarizer is a particular advantage since these liquid crystal cells use no light source other than available light for viewing. The aluminum may be used unanodized or anodized.

The preferred adhesive, a polymeric emulsion of 1,3-butadiene (vinyl ethylene) is available commercially as Airflex 400, sold by Air Products and Chemicals, Inc., contains 55–57 percent solids and is preferably applied at a coverage of about 1 ml/ft.$^2$. Use of this emulsion makes possible the formation of an optical quality seal which does not separate during the manufacture or use of the lamination.

The light polarizer may be either supported or unsupported and will preferably comprise either (a) a film of molecularly oriented polyvinyl alcohol containing a dichroic stain, iodine, (b) a film of polyvinyl alcohol containing a substantially oriented light-polarizing dichroic alteration product of polyvinyl alcohol, such as dehydrated polyvinyl alcohol molecules, or (c) a transparent film containing dichroic dyes such as those disclosed in U.S. Pat. No. 3,391,479. Support for the light polarizer may be, for example, a layer 15 of cellulose acetate butyrate bonded to the polarizer through a hydrophilic tie-coat 14 as disclosed in U.S. patent application Ser. No. 249,651, filed May 2, 1974 and assigned to the assignee of this application, or, for example, a layer of cellulose acetate and structurally integral therewith, at least two flexible layers 14 and 16 of polyvinyl alcohol positioned in superimposed relation to each other on at least one surface of said cellulose acetate support, the surface of said cellulose acetate support adjacent the superimposed layers of polyvinyl alcohol comprising a predetermined amount of regenerated cellulose, as disclosed in U.S. Pat. No. 2,416,510.

While the adhesive used to bond the reflective, light-polarizing structure to the liquid crystal cell 17 may be either a pressure-sensitive adhesive such as, for example, vinyl acetate-acrylic copolymer sold as Flexbond FL-150 (Air Products and Chemicals, Inc.), a thermoplastic adhesive, such as, for example, polyethyl acrylate sold as Rhoplex LC-40 (Rohm and Haas Co.), or a reactive adhesive, such as, for example, the various epoxies, the preferred adhesive is a water-remoistenable adhesive, that is, an adhesive activated by an application of water, such as, for example, that formed by adding to a mixture of three or four parts by weight of a starch and one part by weight of a gelatin or animal glue, ten percent of a plasticizer such as urea and sufficient wetting agent to allow formation of a smooth coating. A satisfactory animal glue would be of 70–120 g viscosity. A preferred example of water-remoistenable adhesive was prepared by stirring 25 parts by weight of Sta-Tape, a modified corn starch sold as Sta-Tape 20-AG (from A. E. Staley Manufacturing Co.) into 100 parts by weight of water. This mixture was heated for about 30 minutes at 90°–95° C. then allowed to cool to 50°–60° C. Added next were 2.5 parts by weight of urea and 0.0375 parts by weight of a wetting agent (Fluorad FC-128, a fluorinated hydrocarbon from Minnesota Mining and Manufacturing Co.). The mixture was smoothly coated at about 50°–60° C. onto the supported polarizer lamination.

Water remoistenable adhesives such as these have among their advantages simplicity of use resulting in higher overall yields. The adhesives are easy to apply, not tacky as applied, non-bubble-forming on the supported polarizer and easy to remove. Because the adhesives are non-tacky, particles do not stick to the surface causing optical or cosmetic blemishes. Because there is no tendency to form bubbles when the adhesive layer is applied to the supported polarizer, blemishes are not easily formed. The ease of removal with water allows for the reworking of a rejected adhesive application. Subsequent use of the thus-saved cell results in lower production costs and high over-all yields.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A light-polarizing light reflective lamination comprising a layer of aluminum foil having at least one matte surface and a light-polarizing film having first and second surfaces, said first surface being adhesively bonded with a transparent thermoplastic synthetic resin to said matte surface of said aluminum foil.

2. The lamination of claim 1 wherein said light-polarizing film comprises a stretched synthetic plastic material and said matte surface of said foil comprises grooves generally aligned with the stretch axis of said light-polarizing film.

3. The lamination of claim 1 wherein said aluminum foil is anodized.

4. The lamination of claim 1 which further comprises a support layer for said light-polarizing film, said support layer having first and second surfaces, said first surface of said support layer being adhesively bonded to said second surface of said light-polarizing film with a hydrophilic tie coat.

5. The lamination of claim 4 which includes a layer of adhesive on the second surface of said support layer whereby said lamination may be adhered to a field-effect transition liquid crystal device.

6. The lamination of claim 5 wherein said layer of adhesive is a water remoistenable adhesive.

* * * * *